Figure 6:
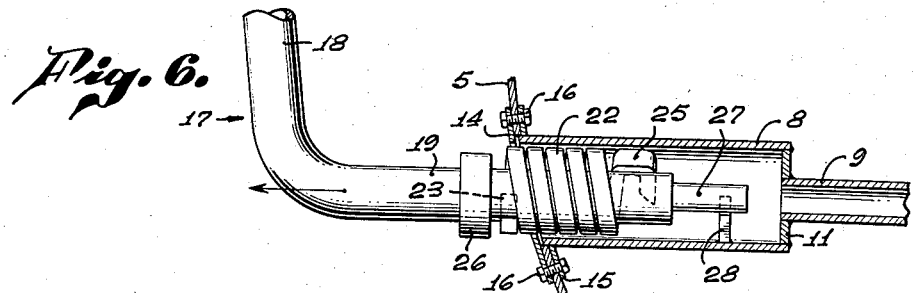

Dec. 23, 1958
C. B. MALONEY
2,865,031
CHASSIS FOR TRAILERS
Filed Aug. 16, 1954
2 Sheets-Sheet 1
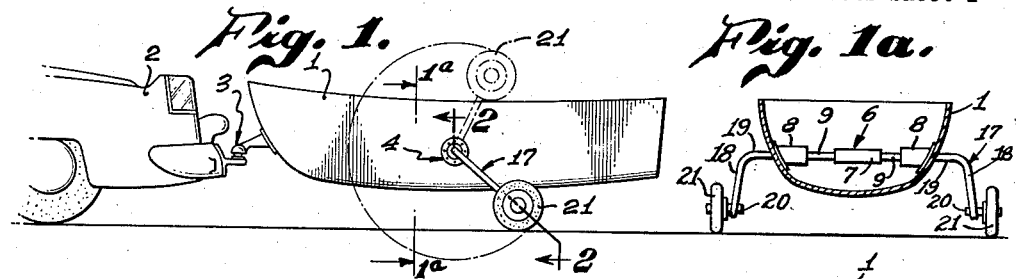
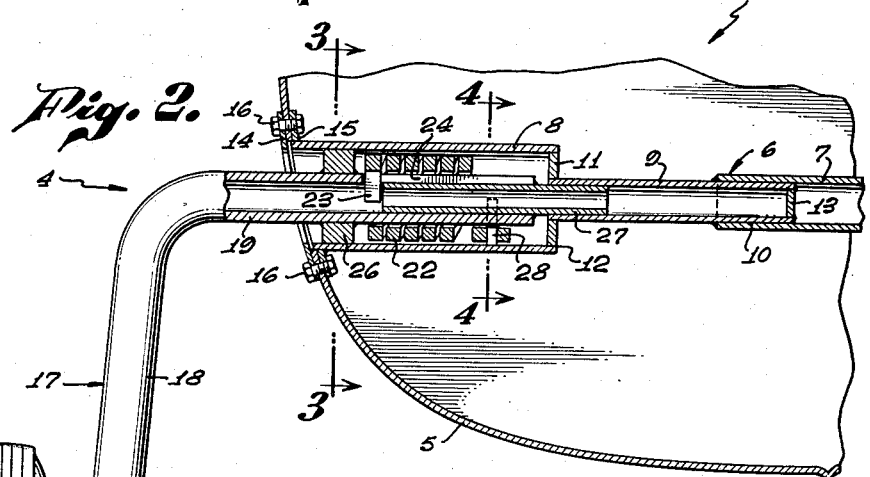
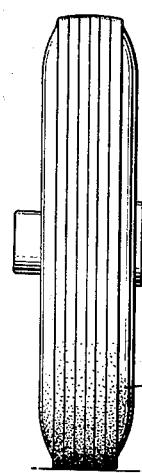
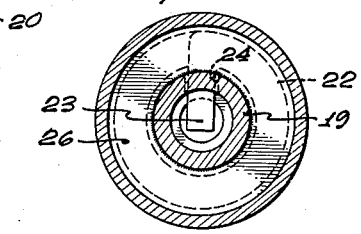
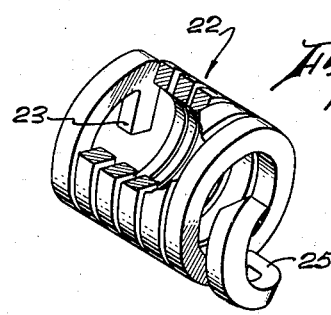
INVENTOR.
CLIFFORD B. MALONEY,
BY
ATTORNEY.

Dec. 23, 1958 C. B. MALONEY 2,865,031
CHASSIS FOR TRAILERS
Filed Aug. 16, 1954 2 Sheets-Sheet 2

INVENTOR.
CLIFFORD B. MALONEY,
BY
ATTORNEY.

United States Patent Office 2,865,031
Patented Dec. 23, 1958

2,865,031

CHASSIS FOR TRAILERS

Clifford B. Maloney, Ontario, Calif.

Application August 16, 1954, Serial No. 450,165

2 Claims. (Cl. 9—1)

The present invention relates to a chassis or wheel suspension for trailers, particularly of that type wherein the chassis is detachable from the trailer, the term trailer being used in its generic sense, prior to use thereof.

Specifically, I have reference to boats, stationary equipment, and other instrumentalities, wherein the device of the invention is placed in position of use only during the time when the article is to be moved from one location to another. The invention has particular applicability to boats, wherein the boat is attached, by suitable hitch, to a motor vehicle, to be moved over the highway on wheels, and wherein the wheels and the structure connected therewith may be easily and quickly removed from the boat, or placed in inoperative position relative to the boat, as desired.

An object of the invention is the provision of a chassis for any type of structure in order to move the structure easily and quickly from one location to another.

A further object is the provision of a chassis for a structure to be moved, which will support the structure in such a manner as to reduce road shock while the structure is being moved.

A further object is the provision of a chassis for any type of device which is to be moved from one locality to another, and which chassis may be easily handled by an operator without undue fatigue.

A further object is the provision of a chassis which is inexpensive in cost of manufacture, simple to install, foolproof in operation, and generally superior to devices now known to the inventor.

With the above mentioned and other objects in view, the invention consists in the novel and useful provision, formation, construction, association, and relative arrangement of parts, members and features, all as disclosed in certain embodiments in the accompanying drawings, described generally, and more particularly pointed out in the claims.

Figure 7:
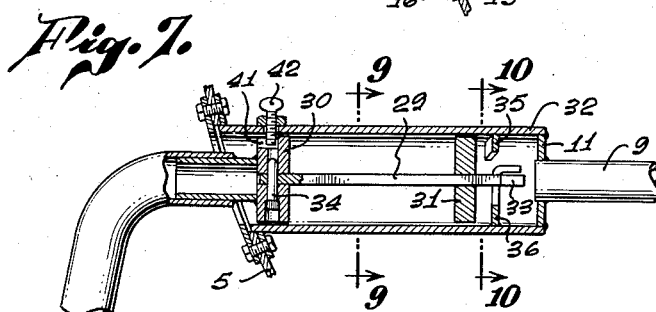
Figure 8:
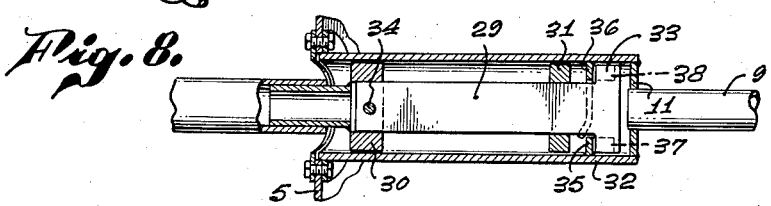
Figure 9:
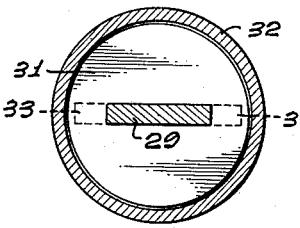
Figure 11:
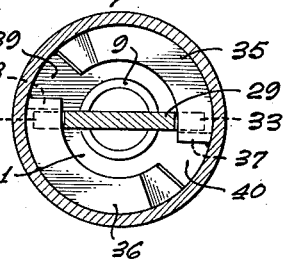
Figure 10:
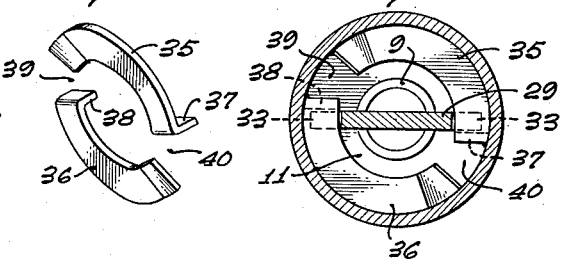
Figure 12:
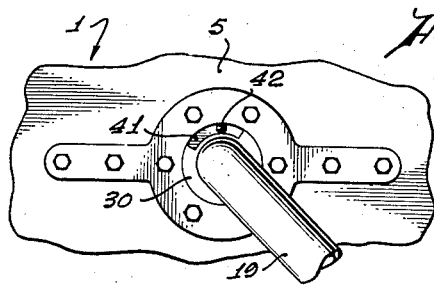

In the drawings:

Figure 1 is a side elevation of a motor vehicle, a boat with a hitch between the vehicle and boat, with the improved chassis supporting the boat for movement over a highway, Figure 1a is a cross-sectional view on the line 1a—1a of Figure 1, Figure 2 is an enlarged fragmentary sectional view on the line 2—2 of Figure 1, Figure 3 is an enlarged sectional view on the line 3—3 of Figure 2, Figure 4 is a sectional view, on an enlarged scale, taken on the line 4—4 of Figure 2, Figure 5 is a fragmentary, partially sectional view, of a torsion spring which may be used in the practice of the invention, Figure 6 is a fragmentary view, partially in longitudinal section, showing certain elements of the invention in moved relationship from the position shown for the same elements in Figure 2, Figure 7 is a fragmentary sectional view of a modification of the chassis construction, Figure 8 is a sectional view of the construction shown in Figure 7, the parts being rotated 90° from the showing of Figure 7, Filgure 9 is a sectional view on an enlarged scale taken on the line 9—9 of Figure 7, Figure 10 is a sectional view on the line 10—10 of Figure 7, and on an enlarged scale, Figure 11 is a perspective view of certain elements used in that form of construction shown in Figures 7, 8 and 10, and, Figure 12 is a fragmentary elevation showing the side of the boat hull utilizing the form of construction shown in Figures 7, 8 and 10.

Referring now to the drawings, in Figure 1, I have shown a boat 1, a draft vehicle 2, and a hitch, designated generally as 3, connecting the boat with the vehicle whereby the boat may be moved over a highway. In order to move the boat over the highway, I provide a chassis, designated generally as 4. This chassis may be moved to the position shown in full lines in Figure 1, or it may be moved to the dotted line position, and either maintained in said dotted line position when the boat is in use in the water, or removed from the boat entirely.

Referring to Figure 2, the boat hull is shown at 5, in transverse section, and adapted to span the sides of the hull is means 6. This means, in the present embodiment of the invention, includes a transverse tubular member 7, a pair of tubular casings 8, one for each side of the boat and in axial alignment, and a pair of tubular members 9 telescopically received within opposite ends of tubular member 7, as shown for one end at 10 in Figure 2 and for both ends in Figure 1a. The tubes 7 and 9 form tubular bridging pieces between the pair of casings 8. Each tubular member 9 is secured to an annular plate 11 which closes one end of each tubular casing 8, as shown at 12. Members 9, in each instance, are welded, or otherwise secured, to the tubular members 7, and, in each instance, the tubular members 9 are capped at their ends, as shown at 13. The outermost ends of the tubular casings 8 are provided with flanges of annular or other form, designated as 14, together with annular washers 15, between which washers, in each instance, and the annular flanges 14, is positioned the boat hull, the boat hull being formed with an opening of a size substantially equal to the outer diameter of the tubular casing 8, and with a suitable gasket or gaskets placed between the said flanges or flange 14 and the exterior surface of the boat hull. Transverse bores are made in the said flanges 14 and 15 as well as the boat hull and the gaskets, with bolts 16 passed through said bores, and nuts carried by the said bolts, whereby the device, as an entirety, which includes the tubular casings and tubing members 7 and 9, are securely clamped in position between sides of the boat hull in water-tight relationship. The cap plugs 13, in each instance, prevent ingress of water through the tubes into the boat. This, as stated, forms a permanent fixture for the boat. The chassis includes a pair of struts, one of which is shown in Figure 2, at 17. Each strut is of tubular form and both struts are identical and, therefore, the strut shown in Figure 2 will be described.

The tubular strut is bent so as to have two portions 18 and 19 in slightly greater than right angular relationship, the portion 18 carrying a stud axle 20 for a wheel 21, while portion 19 carries a surrounding coil spring 22, of the form shown in Figure 5. As shown in Figure 5, one coil terminates in an end 23 adapted to be passed through a longitudinal slot 24 which extends to the end of portion 19. The opposite end of said coil spring is bent in U-form, as shown at 25. Welded or otherwise secured to portion 19 is a collar 26 which functions as a bearing within the tubular casing 8. The part 19 of the strut telescopically carries a tubular member 27, which projects beyond the end of the part 19 for reception within the tubular member 9. Tubular member 27 functions to hold the end 23 of the coil spring 22 in the position shown in Figure 2, and likewise acts as a bearing in tube 9. The inner wall of the tubular casing 8 is provided with a flange or wall 28 in the form of a sector of an annulus (see Figure 4). It is intended, when the parts are in the position shown in Figures 1 and 2, the U-shaped return portion 25, should bridge or saddle the wall 28. Thus, when the chassis, with its wheel, is in the position shown in Figure 1, in full lines, the coil spring is in tension, the strut being at an angle to vertical and resiliently held in the position of Figure 1, whereby road shock is absorbed by the spring as the wheel moves over obstructions in the road.

In place of using the torsion spring of Figure 5, I may utilize a torsion bar, illustrated in Figures 7 to 10, inclusive. In these latter figures, I have shown a bar 29 fitted within two circular collars 30 and 31, the collars being slotted to permit passage therethrough of the flat type torsion bar. The collars have a diameter substantially equal to the internal diameter of the tubular casing 8, and, in this instance, the tubular casing is designated as 32, due to certain other structural changes therein. The torsion bar is provided with a T or crosshead 33, that is to say, it has wings extending from the sides of the shank. This torsion bar is fastened in any appropriate manner, such as by the means 34, to collar 30, while the collar 31 is secured to said bar by shrink-fit. Within the tubular casing 32 are a pair of members 35 and 36, and which are welded or otherwise secured to the tubular casing. These members are in the form of sectors of an annulus, and each member thereof is provided with an angular end 37 and 38, which function as stops. These two members do not lie in the same plane, in that they are offset relatively, as shown in Figure 7, and spacing is allowed between the two members, as indicated at 39 and 40. Thus, the T head of the torsion bar may be inserted between the spaces at 39 and 40, followed by rotation which will bring the wings of the torsion bar into engagement with the ends 37 and 38. This provides a locked position for the torsion bar, and any movement of the strut toward the full line position in Figure 1 will impose a torsion upon the said torsion bar. The remaining construction for the tubular casing 32 is the same as for the tubular casing 8, so far as its joinder with the boat hull is concerned.

It will be noted, upon reference to Figures 7 and 12, that the collar 30 is provided with a segmental groove 41 and that the tubular casing 32 carries a screw 42 which may be moved within the said groove so as to hold the said collar between defined positions of rotation. Thus, the screw 42 may be moved upwardly out of said groove and the strut turned to revolve the same to the dotted line position in Figure 1, whereupon the screw may be replaced for reception in the bore for pin 34, to the end that the strut with its wheel will be held in the vertical position shown. The same construction may be applied to the collar 26, illustrated in Figure 2.

The operation, uses and advantages of the invention just described are as follows:

Referring first to that form of the invention shown in Figures 2 to 6, inclusive, by revolving the strut 17 to the dot-dash position in Figure 1, the U-shaped returned end of the spring 22 will disengage the flange 28, whereupon the strut may be moved outwardly of the tubular casing 8, carrying with it the collar 26, spring 22, and the tube 27. The strut, with its wheel, may then be placed in the device being towed, such as a boat; or, if desired, the strut may be moved from the full line position of Figure 1 to the dotted line position of the same figure, without removing the coil spring 22, its collar 26, and tube 27. When the wheels are in the upward position shown in dotted lines in Figure 1, the wheels may be revolved to full line position in the following manner, viz: the wheels are moved from the dotted line position so as to engage the roadway, and it has been found that the wheels will automatically move to the full line position of Figure 1 when the draft vehicle pulls the boat over the ground. Friction occurs between the wheels and the surface of the ground sufficient to move the struts 17 into the full line position shown in Figure 1. It is also evident that if the wheels are revolved from the dotted line position of Figure 1, to the surface of the water, assuming that the boat is still in water, and the boat is then secured by the hitch 3 to the draft vehicle 2, movement of the draft vehicle will cause the struts 17 with the wheels 21 to move to the full line position shown. Other methods of having the wheels 21 assume the full line position shown may be accomplished by the use of chocks placed in front of the wheels 21, when the wheels are revolved toward the ground. Such an obstruction will hold the wheels against movement as the boat moves forwardly to thereby revolve the structs 17 counter-clockwise.

In the form of the invention shown in Figures 7 to 10, inclusive, the torsion bar with the two collars may be removed from the tubular casing 32 when the T-head or wings are moved to a position which permits passage thereof through the ways 39 and 40. Removal of the strut will carry with it the said collars, together with the torsion bar, it being assumed, of course, that the screw 42 has been moved upwardly out of contact with the collar 30. Assuming that both struts and wheels have been removed from the sides of the boat and placed within the boat, it is quite evident that water will not enter the boat through said tubes 7 or 9, and the tubular casing 8, for the reason that the tubes 9, in each instance, are plugged, as shown at 13.

With this invention, each device to be moved has its own wheel suspension, which wheel suspension is detachable from the device.

It is within the purview of my invention to eliminate entirely the transverse tube 7, and the cap a short length of tube 9.

I claim:

1. In chassis construction: a trailer having a pair of of opposed side walls, a pair of axially aligned tubular casings secured within and to each side wall, each casing adjacent a side wall being open ended with the inner end of each casing closed, a wheeled strut for each side wall, each strut being in part received axially of a casing, means between each casing and each strut for maintaining the strut axially therein, that portion of each strut within a casing being provided with a longitudinal slot, a coil spring adapted to surround the longitudinal slot of each strut, and provided with an end portion received in said slot; the opposite end of said spring provided with a spaced returnedly bent portion, and means in each casing for reception in said returnedly bent portion to detachably anchor the spring thereto.

2. In chassis construction: a boat having a hull provided with side walls, a pair of axially aligned tubular casings secured to the side walls within the confines of the hull, that portion of each casing adjacent a side wall being open-ended, and the inner ends of each casing being closed, tubular bridging pieces extending between the closed ends of the pair of casings, a pair of substantially L-shaped tubular struts and a wheel carried by each strut; one portion of each strut provided with a longitudinally extending slot extending inwardly from the end thereof, a coil spring surrounding the said slot of each strut and provided with an end portion received in the slot, the opposite end of said coil spring provided with a returnedly bent portion, there being a flange secured to and within each tubular casing for reception in the returnedly bent portion of each spring, a tubular member telescopically received in the slotted portion of each L-shaped strut and received within the said tubular bridging pieces, and a collar secured to each L-shaped strut for reception in each tubular casing adjacent the open ends thereof.

References Cited in the file of this patent

UNITED STATES PATENTS

| | | |
|---|---|---|
| 2,457,567 | Kuns | Dec. 28, 1948 |
| 2,540,279 | Mosier | Feb. 6, 1951 |
| 2,558,311 | Morrow | June 26, 1951 |
| 2,632,655 | King et al. | Mar. 24, 1953 |
| 2,662,236 | Kester | Dec. 15, 1953 |
| 2,688,481 | Bergquist | Sept. 7, 1954 |